US006639502B2

(12) United States Patent
Herrick

(10) Patent No.: US 6,639,502 B2
(45) Date of Patent: Oct. 28, 2003

(54) OVERLOAD PROTECTOR WITH CONTROL ELEMENT

(75) Inventor: Kent B. Herrick, Saline, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 10/337,521

(22) Filed: Jan. 7, 2003

(65) Prior Publication Data

US 2003/0102954 A1 Jun. 5, 2003

Related U.S. Application Data

(63) Continuation of application No. 09/586,857, filed on Jun. 5, 2000.

(60) Provisional application No. 60/138,760, filed on Jun. 11, 1999.

(51) Int. Cl.[7] .......................... H01H 71/16; H02H 5/06

(52) U.S. Cl. ........................ 337/102; 337/377; 361/32; 361/105; 318/783

(58) Field of Search ............................ 337/56, 85, 89, 337/97, 100–102, 112, 333, 342, 343, 377–380, 349; 361/31, 32, 103, 105; 318/767, 778, 783

(56) References Cited

U.S. PATENT DOCUMENTS

| | | | | | |
|---|---|---|---|---|---|
| 2,516,538 | A | | 7/1950 | Armstrong | 175/294 |
| 2,763,750 | A | | 9/1956 | Adams et al. | 200/122 |
| 3,167,699 | A | | 1/1965 | Renaud | 318/221 |
| 3,192,345 | A | | 6/1965 | Epstein | 200/122 |
| 3,602,862 | A | | 8/1971 | D'Entremont | 337/104 |
| 3,636,426 | A | | 1/1972 | Buiting | 318/471 |
| 4,086,558 | A | | 4/1978 | Pejouhy et al. | 337/102 |
| 4,332,142 | A | | 6/1982 | Prada | 62/152 |
| 4,376,926 | A | | 3/1983 | Senor | 337/104 |
| 4,406,590 | A | | 9/1983 | Kessler | 417/360 |
| 4,570,143 | A | | 2/1986 | Bridges et al. | 337/75 |
| 4,573,325 | A | * | 3/1986 | Chiu et al. | 62/129 |
| 4,866,408 | A | | 9/1989 | Petraitis et al. | 337/104 |
| 4,908,595 | A | | 3/1990 | Niino | 337/105 |
| 5,184,269 | A | | 2/1993 | Shimada et al. | 361/24 |
| 5,200,872 | A | | 4/1993 | D'Entremont et al. | 361/25 |
| 5,367,279 | A | | 11/1994 | Sakai | 337/104 |
| 5,515,229 | A | | 5/1996 | Takeda | 361/105 |
| 5,615,072 | A | | 3/1997 | Hofsass et al. | 361/24 |
| 5,729,416 | A | | 3/1998 | Renkes et al. | 361/23 |
| 5,995,351 | A | | 11/1999 | Katsumata et al. | 361/105 |
| 6,127,913 | A | | 10/2000 | Niino et al. | 337/343 |

FOREIGN PATENT DOCUMENTS

| | | |
|---|---|---|
| JP | 40-1081644 | 3/1989 |

* cited by examiner

*Primary Examiner*—Anatoly Vortman
(74) *Attorney, Agent, or Firm*—Baker & Daniels

(57) ABSTRACT

A hermetic compressor is disclosed having an electric motor, a compressor unit, and an overload protector within a hermetically sealed housing. The overload protector includes a thermally activated switching device for selectively providing current to the electric motor, a heater element thermally coupled to the switching device, and a control circuit controlling the heater element. The overload protector allows the disconnection of power to the motor due to factors and conditions specified in the remotely located control circuit.

3 Claims, 5 Drawing Sheets

OVERLOAD PROTECTOR WITH CONTROL ELEMENT

BACKGROUND OF THE INVENTION

Existing overload protectors in hermetic compressors use a combination of a heating element and a bimetallic switching device to break the motor circuit if current or temperature limits are exceeded. In a locked rotor condition a current trip will be primarily driven by $I^2R$ losses through the heater, while a running high temperature trip is more influenced by the ambient temperature. With either influence, the temperature reaches a point such that the bimetallic switching device "snaps" into a new position, thus breaking the circuit.

Typical devices used in motor applications for temperature and/or current protection include those as disclosed in U.S. Pat. No. 3,167,699 (Renaud), U.S. Pat. No. 5,615,072 (Hofsass et al), U.S. Pat. No. 5,575,229 (Takeda), and U.S. Pat. No. 4,866,408 (Petraitis et al) and commercially available hermetic motor protectors from Texas Instruments, Inc. of Dallas, Tex. given product designation 33HM800 or the like.

The heaters in the above mentioned devices connect in series with the mains circuit of a motor. When the current in the mains circuit increases to a level above the specified maximum current limit for the motor, the heat generated by this level of current through the heater will be adequate to trip the bimetallic switching device and open the mains circuit.

SUMMARY OF THE INVENTION

The present invention provides for the use of a control element powered and/or controlled from a separate control circuit. In one embodiment heating the bimetallic switching device with this control element, the circuit can be broken on command from a control signal, independent of the mains power conditions. In another embodiment a control element and a normally closed switch are connected in parallel with the mains power circuit. The switch is operated by a control signal. When the switch is closed and the mains circuit is powered, the mains circuit will be broken.

Unlike prior motor protectors, which include heaters not independently controlled, the present invention incorporates at least one heater which is operatively connected to a control circuit for controlled actuation of the protective device.

One advantage of the present invention is that the circuit can be broken from a control signal, independent of the mains power condition. The control signal will allow the circuit to be broken due to other factors or conditions other than the exceeding of current or temperature limits.

Another advantage of the present invention is that with the inclusion of current and temperature monitoring devices into the control circuit, the heating element for the current protection in the overload protector could be eliminated and the overload protector would not have to be located in such an extreme environment to detect the temperature trip level.

Another advantage of the present invention is that it does not require a large heat sink as would a silicon rectifier.

Another advantage of the present invention is that power must be applied to the control circuit and no trip conditions sensed before the motor can be operated.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
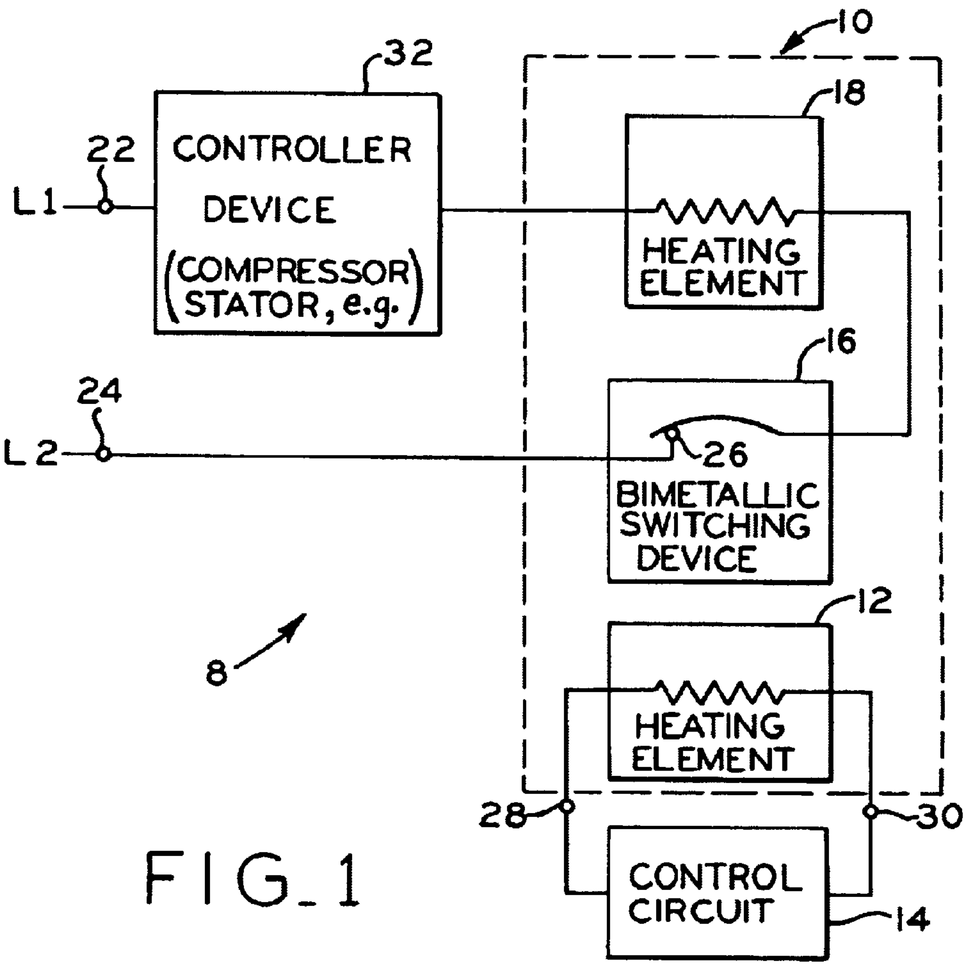
FIG. 1 is a schematic block diagram of the basic representation of the first embodiment of the present invention.

Corresponding reference characters indicate corresponding parts throughout the several views. Although the drawings represent embodiments of the invention, the drawings are not necessarily to scale, and certain features may be exaggerated or omitted in selected drawings in order to better illustrate and explain the present invention.

DETAILED DESCRIPTION OF THE DRAWINGS

The first embodiment of the present invention as shown in FIG. 1 provides a circuit control device 10, that may be a component of a hermetic compressor 8, for example, which device 10 includes a heating element 18 coupled to the mains circuit of the compressor stator 32, a bimetallic switching device 16, and a control heating element 12 powered from a separate control circuit 14. Control heating element 12 and heating element 18 are adjacent to and in thermal contact with bimetallic switching device 16. The mains circuit, heating element 18 and bimetallic switching device 16 are connected in series to a power line L1, L2 and via external connectors 22 and 24. Control heating element 12 is connected to external connectors 28 and 30. Control circuit 14 is connected to control heating element 12 via external connectors 28 and 30.

Figure 7:
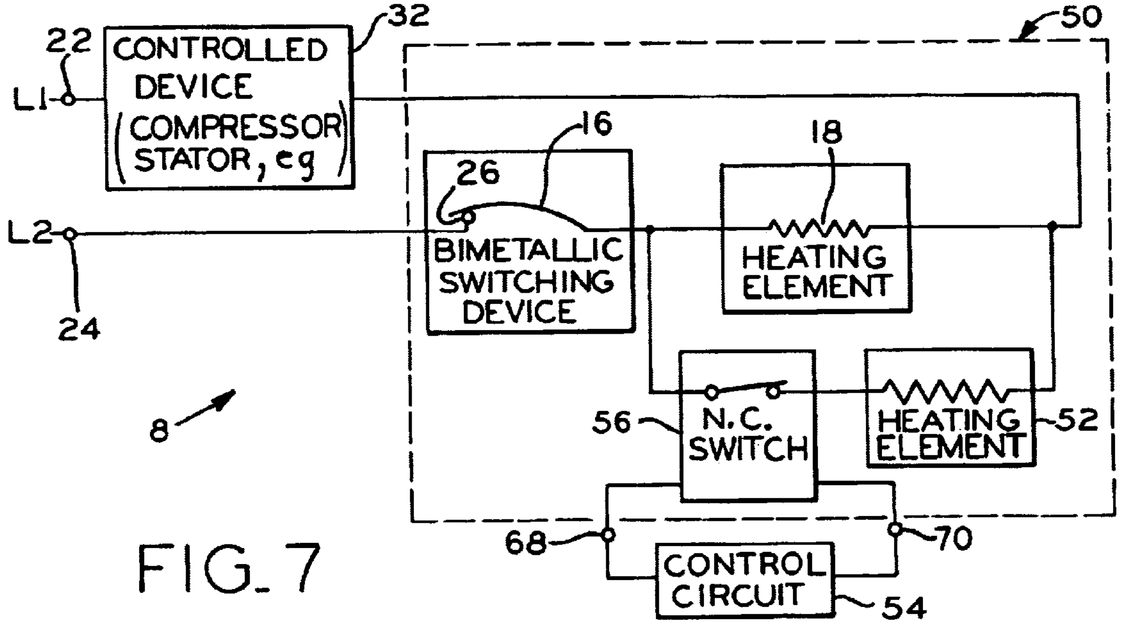
FIG. 7 is a schematic block diagram of the basic representation of the second embodiment of the present invention.

The second embodiment of the present invention as shown in FIG. 7 provides circuit control device 50, that may be a component of hermetic compressor 8, for example, which device 50 includes heating element 18 coupled to the mains circuit of compressor stator 32, bimetallic switching device 16, control heating element 52, and normally closed switch 56 operated from separate control circuit 54. Control heating element 52 and heating element 18 are adjacent to and in thermal contact with bimetallic switching device 16. The mains circuit, heating element 18 and bimetallic switching device 16 are connected in series to a power line L1, L2 and via external connectors 22 and 24. Control heating element 52 and switch 56 are connected in parallel to the mains circuit. Switch 56 is connected to external connectors 68 and 70. Control circuit 54 is connected to switch 56 via external connectors 68 and 70.

The present invention can be used in a hermetic compressor, as just one example. Overload and overheating protection along with control due to other desired factors or conditions is offered by the present invention. One hermetic compressor, which is applicable to use with the present invention, is disclosed in U.S. Pat. No. 5,785,151, which is assigned to the assignee of the present invention, the disclosure of which is explicitly incorporated by reference.

FIG. 1 shows a schematic block diagram of a hermetic compressor 8 with a first external connector 22 and a second external connector 24 through which electrical power is supplied tp circuit control device 10 connected in series with controlled device 32, for example the electric motor of a compressor. Circuit control device 10, a first embodiment of the present invention, consists of heating element 18 coupled to the mains circuit, bimetallic switching device 16, and control heating element 12 powered from separate control circuit 14. Control circuit 14 enables opening or closing of switch 16 for conditions other than overheating or overloading.

Control circuit 14 contains circuitry for monitoring motor current and high/low voltage conditions. In addition, a sensorless temperature measurement scheme may be employed to protect the motor winding from overheating in any running condition. Provisions may be made to output current, temperature and trip information to an optional externally mounted circuit board that could be linked to an HVAC central control system.

If bimetallic switching device 16 senses a temperature below its release temperature bimetallic switching device 16 completes the connection with contact 26 so that the operating current flows through the electric part, for example, stator windings 32. If the temperature of bimetallic switching device 16 now rises, due either to an increase in temperature of the electrical part to be monitored or to an excess operating current through heating element 18, which heats up correspondingly, bimetallic switching device 16 opens when it exceeds its release temperature. Bimetallic switching device 16 can also be opened when logic in control circuit 14 allows sufficient current to flow through control heating element 12, which heats up correspondingly, causing the temperature of bimetallic switching device 16 to exceed its release temperature. The opening of bimetallic switching device 16 interrupts the flow of current through the electric part.

Figure 2:
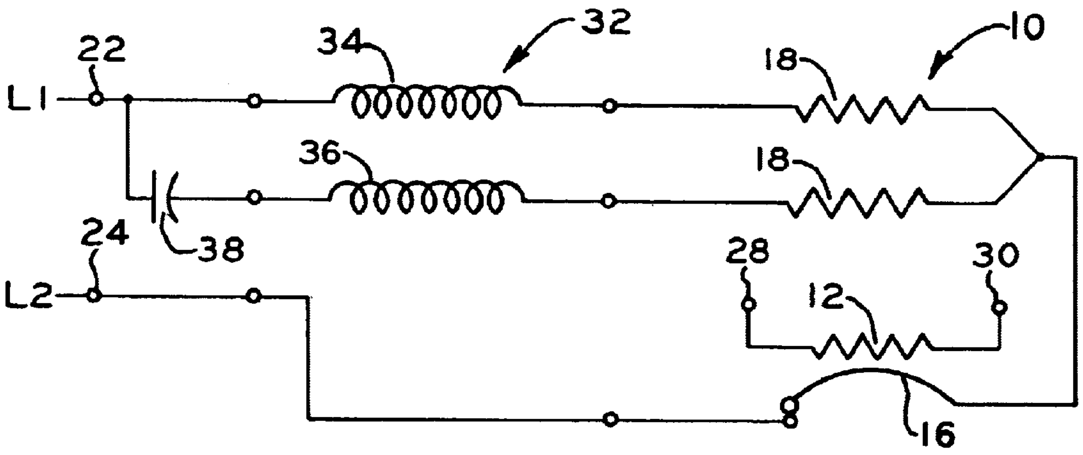
FIG. 2 is a typical circuit diagram of the first embodiment of the present invention in a single phase configuration for a permanent split capacitor motor.

FIG. 2 shows a schematic diagram of the first embodiment of the present invention in a single phase configuration for a permanent split capacitor motor used in a hermetic compressor, for example. The present invention provides internal protection for one to five horsepower motors, typically used in the compressors of commercial refrigerators, unitary air conditioners and heat pumps. The heater in the mains circuit may not be required depending on the application. Split capacitor motor 32 includes main winding 34, start winding 36, and capacitor 38. Circuit control device 10 comprises bimetallic switching device 16, heaters 18, and control heating element 12 coupled to control circuit 14 via pins 28 and 30. Either heaters 18, control heating element 12 or ambient temperature can activate bimetallic switching device 16 and shut down motor 32.

Figure 3:
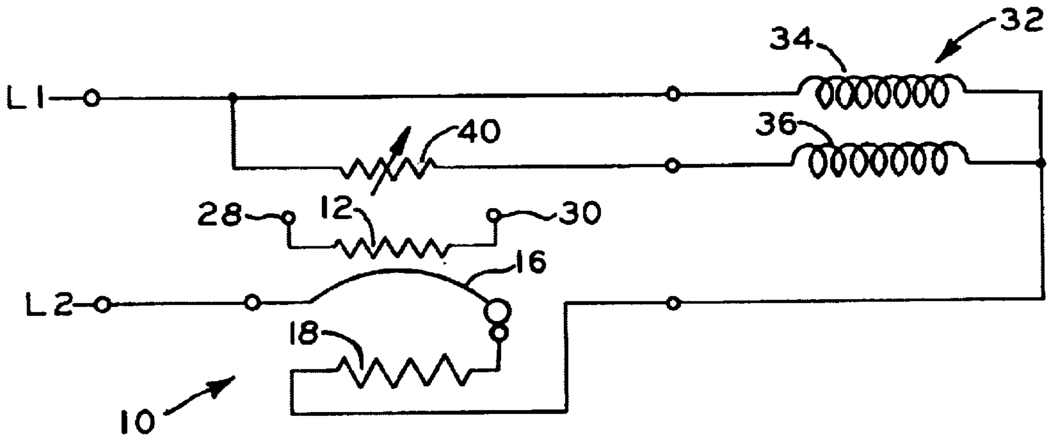
FIG. 3 is a typical circuit diagram of the first embodiment of the present invention in a single phase configuration for a repulsion-start, induction-run (RSIR) motor.

FIG. 3 shows a schematic diagram of the first embodiment of the present invention in a single phase configuration for a RSIR motor. The present invention provides external protection for fractional horsepower motors, typically used in the compressors of residential refrigerators and room air conditioners. The heater in the mains circuit may not be required depending on the application. RSIR motor comprises main winding 34, start winding 36, and start resistor 40. Circuit control device 10 includes bimetallic switching device 16, heater 18, and control heating element 12 coupled to control circuit 14 via pins 28 and 30. Motor 32 can be shut down by the activation of bimetallic switching device 16 by the ambient temperature, heater 18, or control heating element 12.

Figure 4:
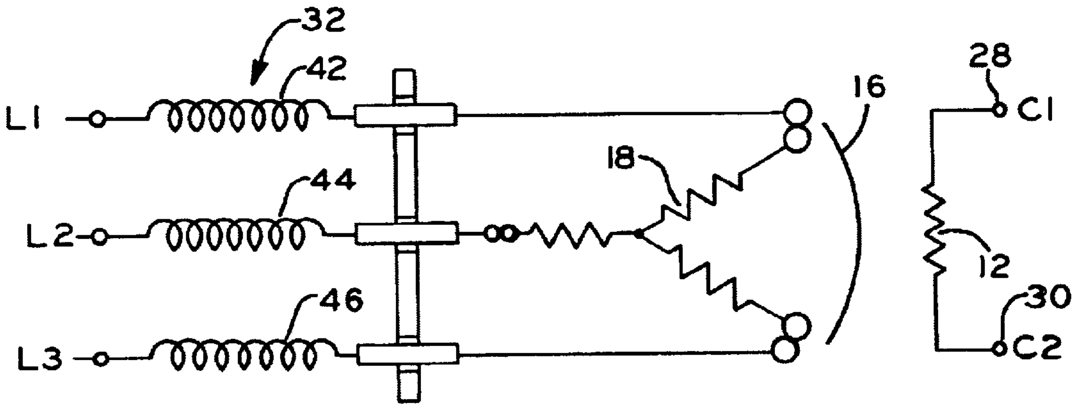
FIG. 4 is a typical circuit diagram of the first embodiment of the present invention in a three phase configuration.
Figure 5:
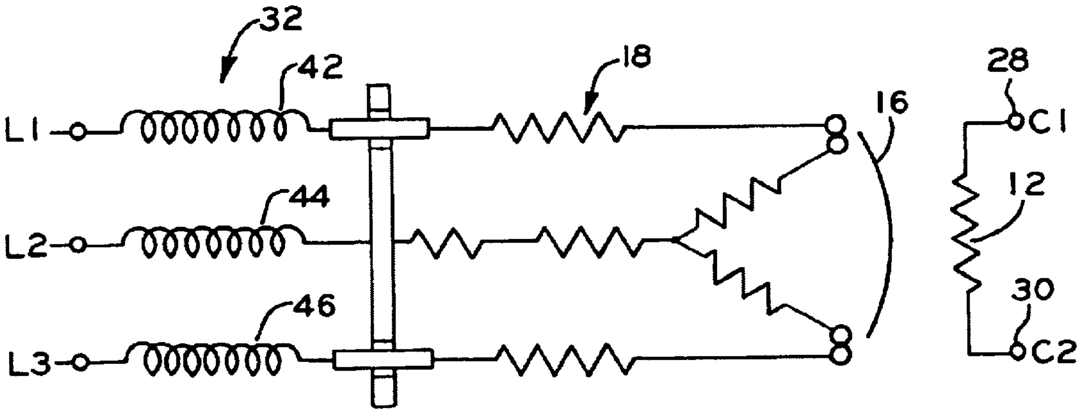
FIG. 5 is another typical circuit diagram of the first embodiment of the present invention in a three phase configuration.

FIGS. 4 and 5 show schematic diagrams of the first embodiment of the present invention in three phase configuration. The heater or heaters in the mains circuit may not be required depending on the application. Three phase motors 32 contain three windings 42, 44, 46. Circuit control device 10 comprises bimetallic switching device 16, heaters 18, and control heating element 12 coupled to control circuit 14 via pins 28 and 30. In both cases the current to motors 32 can be interrupted by the ambient temperature, heaters 18, or control heating element 12 causing bimetallic switch 16 to open.

Figure 6:
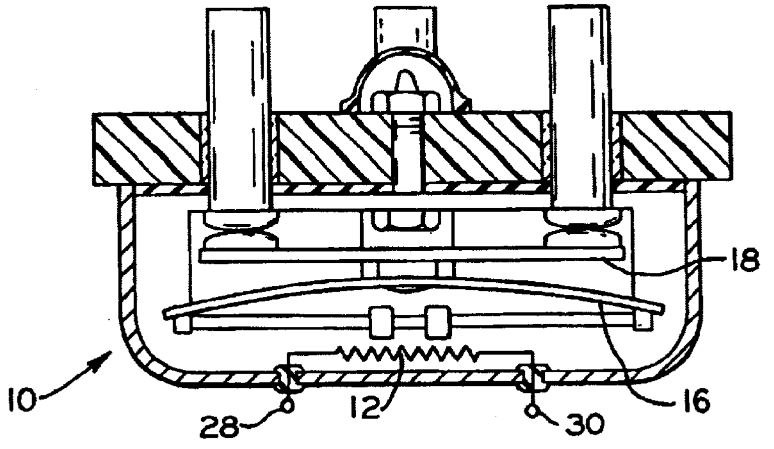
FIG. 6 is an example of the present invention in hermetic motor protector 33HM800 from Texas Instruments.

FIG. 6 shows an example of the first embodiment of the present invention in hermetic motor protector 33HM800 from Texas Instruments. Circuit control device 10 includes bimetallic switching device 16, heater 18, and control heating element 12 coupled to control circuit 14 via pins 28 and 30. Switching device 16 can be activated by the ambient temperature, heater 18, or control heating element 12.

FIG. 7 shows a schematic block diagram of a hermetic compressor 8 with a first external connector 22 and a second external connector 24 through which electrical power is supplied to circuit control device 50 connected in series with controlled device 32, for example the electric motor of a compressor. Circuit control device 50, a second embodiment of the present invention, consists of heating element 18 coupled to the mains (NC switch) circuit, bimetallic switching device 16, control heating element 52, and normally closed switch 56 operated from separate control circuit 54. Control circuit 54 enables opening or closing of bimetallic switching device 16 for conditions other than overheating or overloading.

Control circuit 54 contains circuitry for monitoring motor current and high/low voltage conditions. In addition, a sensorless temperature measurement scheme may be employed to protect the motor winding from overheating in any running condition.

Provisions may be made to output current, temperature and trip information to an optional externally mounted circuit board that could be linked to an HVAC central control system.

If bimetallic switching device 16 senses a temperature below its release temperature, bimetallic switching device 16 completes the connection with contact 26 so that the operating current flows through the electric part, for example, stator windings 32. If the temperature of bimetallic switching device 16 then rises sufficiently, due either to an increase in temperature of the electrical part to be monitored or to an excess operating current through heating element 18, which heats up correspondingly, bimetallic switching device 16 opens when it exceeds its release temperature. Bimetallic switching device 16 can also be opened when logic in control circuit 54 closes switch 56 and allows current to flow through control heating element 52, which heats up correspondingly, causing the temperature of bimetallic switching device 16 to exceed its release temperature. Control heating element 52 is sized to immediately cause bimetallic switching device 16 to open if current is applied to control heating element 52. Normally closed switch 56 will only open if power is applied to control circuit 54 and no trip conditions are set. The opening of bimetallic switching device 16 interrupts the flow of current through the electric part.

Figure 8:
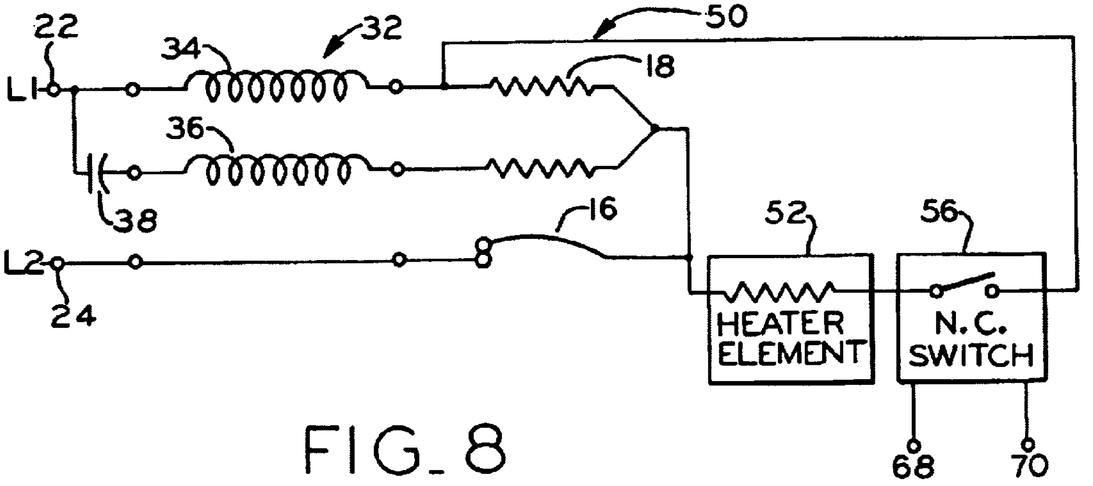
FIG. 8 is a typical circuit diagram of the second embodiment of the present invention in a single phase configuration for a permanent split capacitor motor.

FIG. 8 shows a schematic diagram of the second embodiment of the present invention in a single phase configuration for a permanent split capacitor motor used in a hermetic compressor, for example. The present invention provides internal protection for one to five horsepower motors, typically used in the compressors of commercial refrigerators, unitary air conditioners and heat pumps. The heater in the mains circuit may not be required depending on the application. Split capacitor motor 32 includes main winding 34, start winding 36, and capacitor 38. Circuit control device 50 comprises bimetallic switching device 16, heaters 18, control heating element 52 and NC switch 56 coupled to control circuit 54 (FIG. 7) via pins 68 and 70. Either heaters 18, control heating element 52 or ambient temperature can activate switch 16 and shut down motor 32.

Figure 9:
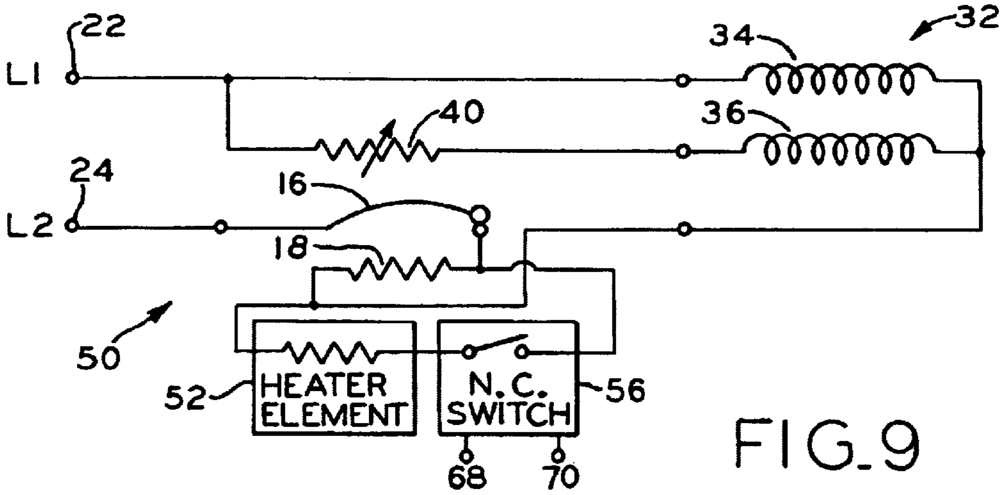
FIG. 9 is a typical circuit diagram of the second embodiment of the present invention in a single phase configuration for a repulsion-start, induction-run (RSIR) motor.

FIG. 9 shows a schematic diagram of the second embodiment of the present invention in a single phase configuration for a RSIR motor. The present invention provides external protection for fractional horsepower motors, typically used in the compressors of residential refrigerators and room air conditioners. The heater in the mains circuit may not be required depending on the application. RSIR motor comprises main winding 34, start winding 36, and start resistor 40. Circuit control device 50 includes bimetallic switching device 16, heater 18, control heating element 52, and NC switch 56 coupled to control circuit 54 (FIG. 7) via pins 68 and 70. Motor 32 can be shut down by the activation of switch 16 by the ambient temperature, heater 18, or control heating element 52.

Figure 10:
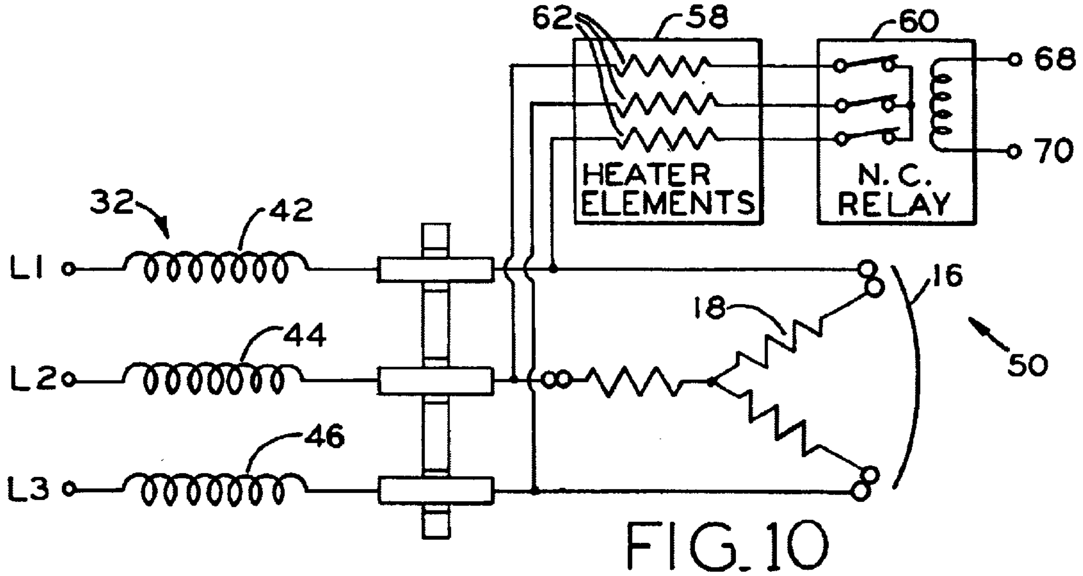
FIG. 10 is a typical circuit diagram of the second embodiment of the present invention in a three phase configuration.

FIG. 10 shows a schematic diagram of the second embodiment of the present invention in three phase configuration. The heater or heaters in the mains circuit may not be required depending on the application. Three phase motor 32 contains three windings 42, 44, 46. Circuit control device 50 comprises bimetallic switching device 16, heaters 18, control heating element 58, and normally closed relay 60 coupled to control circuit 54 (FIG. 7) via pins 68 and 70. Control heating element 58 includes three heating elements 62, one for each of windings 42, 44, 46. The current to motor 32 can be interrupted by the ambient temperature, heaters 18, or control heating element 58 causing bimetallic switch 16 to open.

Figure 11:
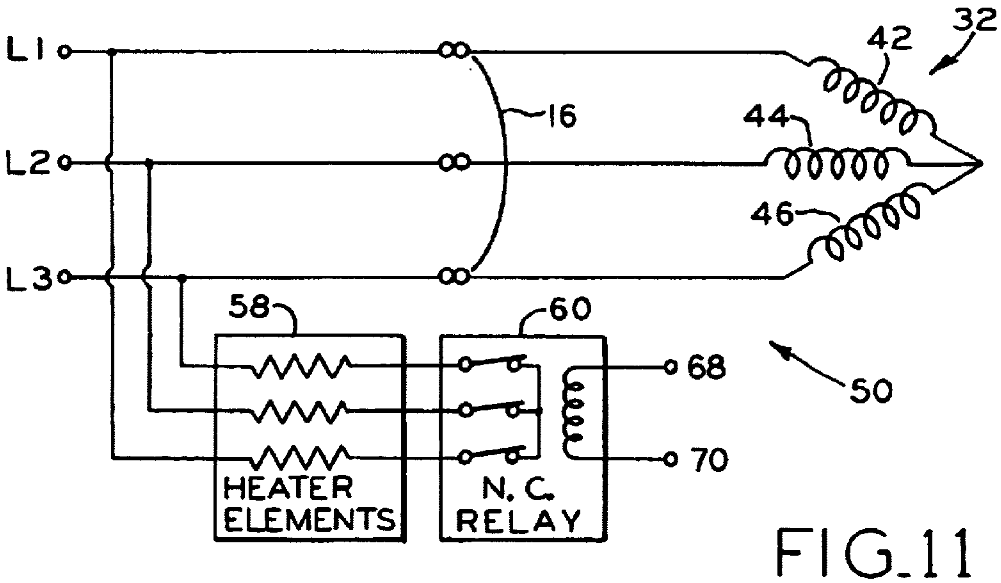
FIG. 11 is another typical circuit diagram of the second embodiment of the present invention in a three phase configuration.

FIG. 11 shows a schematic diagram of the second embodiment of the present invention in another three phase configuration. Three phase motor 32 contains three windings 42, 44, 46. Control circuit 50 comprises bimetallic switching device 16, control heating element 58 and normally closed relay 60 coupled to control circuit 54 (FIG. 7) via pins 68 and 70. Control heating element 58 includes three heating elements 62, one for each of windings 42, 44, 46. The current to motor 32 can be interrupted by the ambient temperature or control heating element 58 causing bimetallic switch 16 to open.

Figure 12:
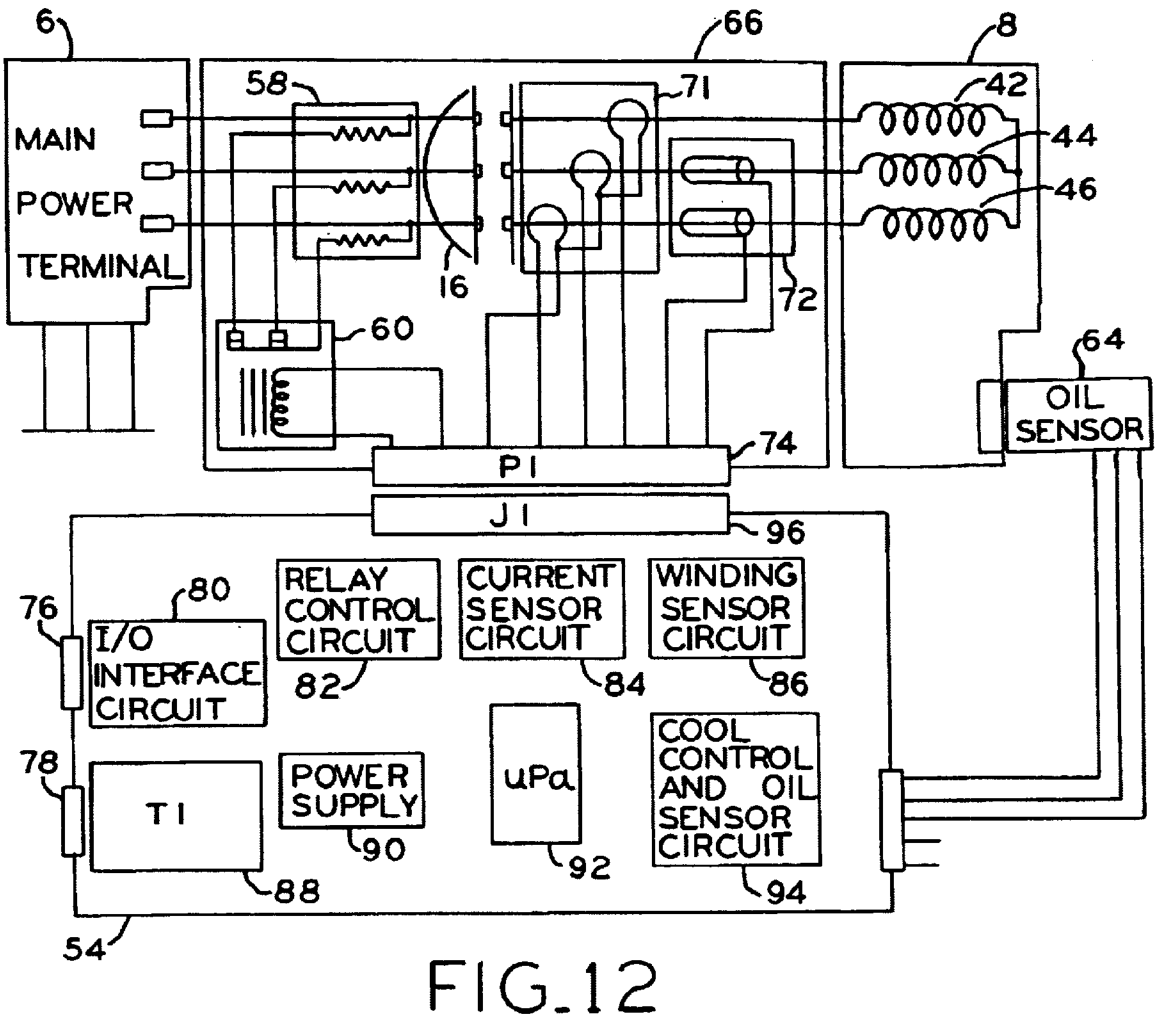
FIG. 12 is a schematic block diagram of compressor control system having a control circuit and using the second embodiment of the present invention.

FIG. 12 shows an application of the second embodiment of the present invention in a compressor control system. The compressor control system includes main power terminal 6, compressor 8, contactor module 66, and circuit control 54 (FIG. 7). Compressor 8 includes low oil sensor 64. Contactor module 66 includes bimetallic switch 16, heater element 58, NC relay 60, current sensor 71, an inductive pickup 72, and external connector 74. Control circuit 54 includes I/O interface circuit 80, relay control circuit 82, current sensor circuit 84, winding sensor circuit 86, transformer 88 having power input 78, power supply 90, microprocessor 92, cool control and low oil sensor circuit 94, and external connector 96.

Figure 13:
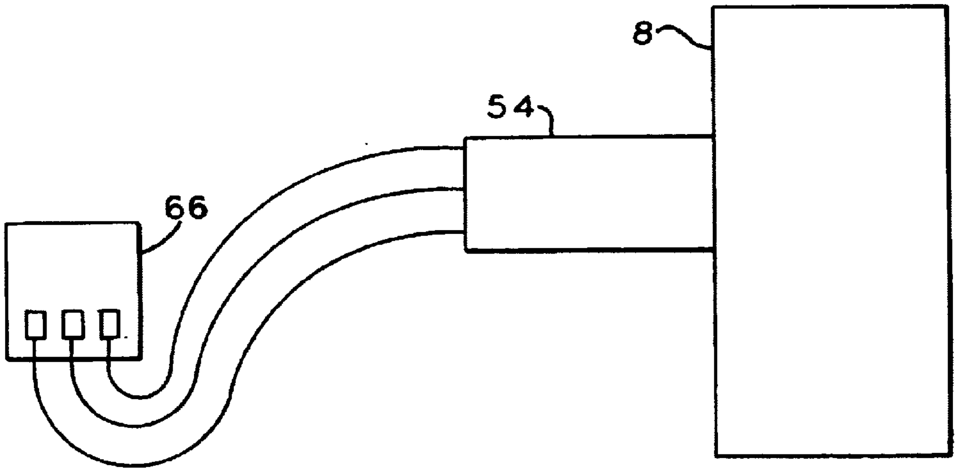
FIG. 13 is an installed view of the compressor control system of FIG. 12.

FIG. 13 shows a view of contactor module 66 and circuit control 54 installed on compressor 8.

Referring to FIG. 12, circuit control 54 receives information from current sensors 71, inductive pickup 72, oil sensor 64, and HVAC interface 76. Using I/O interface 80, current sensor circuit 84, winding sensor circuit 86, cool control and oil sensor circuit 94, and microprocessor 92, control circuit 54 controls normally closed relay 60 through relay control circuit 82.

Bimetallic switching device 16 described above can be a current carrying device or a non-current carrying device coupled mechanically to a connector piece containing switching contacts.

This concept could be used in a variety of configurations including, but not limited to, the following:

single phase or three phase mains power supply bimetallic switching device normally open or normally closed mains fed heater plus an additional control element control element without mains fed heater mains fed heater with additional current superimposed by control circuit in order to raise temperature to release point as an internal (hermetically sealed type) or external device The present invention may be further modified within the spirit and scope of this disclosure. This application is intended to cover departures from the present disclosure as come within known or customary practice in the art to which this invention pertains.

What is claimed is:

1. A hermetic compressor comprising:

a hermetically sealed housing;

an electric motor disposed in said housing and having a plurality of windings;

a compressor unit disposed in said housing and driven by said motor;

a contactor module electrically connected to said electric motor and having a thermally activated switching device for selectively providing current to said electric motor and at least one heater element thermally coupled to said switching device; and a control assembly electrically connected to said contactor module and having a heater element control circuit for activating said heater element;

wherein said contactor module includes at least one current sensor separate from said thermally activated switching device and said control assembly includes a current sensor circuit for determining current to said electric motor.

2. A hermetic compressor comprising:

a hermetically sealed housing;

an electric motor disposed in said housing and having a plurality of windings;

a compressor unit disposed in said housing and driven by said motor;

a contactor module electrically connected to said electric motor and having a thermally activated switching device for selectively providing current to said electric motor and at least one heater element thermally coupled to said switching device; and a control assembly electrically connected to said contactor module and having a heater element control circuit for activating said heater element;

wherein said contactor module includes a current sensor circuit separated from said thermally activated switching device for detecting current to said electric motor, said current sensor circuit connected to said heater element control circuit.

3. A compressor comprising:

an electric motor having a plurality of windings;

a compressor unit driven by said motor;

a contactor module electrically connected to said electric motor and having a thermally activated switching device for selectively providing current to said electric motor and at least one heater element thermally coupled to said switching device; and a control assembly electrically connected to said contactor module and having a heater element control circuit for activating said heater element;

wherein said contactor module includes a current sensor circuit separated from said thermally activated switching device for detecting current to said electric motor, said current sensor circuit connected to said heater element control circuit.

* * * * *